United States Patent
Goward et al.

(10) Patent No.: US 6,396,444 B1
(45) Date of Patent: *May 28, 2002

(54) ANTENNA AND METHOD OF PRODUCTION (75) Inventors: Jason Goward, Billingshurst; Philip Parmenter, Henley on Thames; Brian Davidson, Woking, all of (GB)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/471,505

(22) Filed: Dec. 23, 1999

(30) Foreign Application Priority Data

Dec. 23, 1998  (GB) ............................................. 9828541

(51) Int. Cl.⁷ ................................................. H01Q 1/24
(52) U.S. Cl. .......................... 343/702; 343/873; 29/600
(58) Field of Search ................. 343/702, 872, 343/873; 29/600

(56) References Cited

U.S. PATENT DOCUMENTS

| | | |
|---|---|---|
| 4,123,756 A | 10/1978 | Nagata et al. |
| 4,546,357 A | 10/1985 | Laughon et al. ............ 343/702 |
| 5,709,832 A | 1/1998 | Hayes et al. ........... 264/272.11 |
| 5,768,217 A | 6/1998 | Sonoda et al. ................ 368/10 |
| 5,920,290 A | * 7/1999 | McDonough et al. ....... 343/873 |
| 6,006,419 A | * 12/1999 | Vandendolder et al. ....... 29/600 |

FOREIGN PATENT DOCUMENTS

| | | |
|---|---|---|
| EP | 0615285 | 9/1994 |
| JP | 59202831 | 11/1984 |
| JP | 61245704 | 11/1986 |
| JP | 08216571 | 8/1996 |
| JP | 10173423 | 6/1998 |

* cited by examiner

Primary Examiner—Don Wong
Assistant Examiner—Shih-Chao Chen
(74) Attorney, Agent, or Firm—Antonelli, Terry, Stout & Kraus, LLP (57) ABSTRACT

A method of forming a unitary housing element of an apparatus and incorporating an antenna is incorporated into the unitary housing element. The method includes the steps of printing onto a first surface of a carrier film, using conductive ink, the antenna, inserting the carrier film into a mold, and forming the unitary housing element by injecting a molding material onto the mold, thereby incorporating the antenna into the unitary housing element.

14 Claims, 6 Drawing Sheets

ANTENNA AND METHOD OF PRODUCTION

BACKGROUND OF THE INVENTION

The present invention relates to internal antennas for use in telecommunications equipment, particularly portable radiotelephones, and a method of their manufacture.

All mobile telecommunication equipment, such as portable radiotelephones, require at least one antenna in order to be able to receive and/or transmit radio signals. Traditionally these have taken the form of structures external to the main body of the equipment.

Whip antennas were once used widely, but due to their physical size in relation to the ever smaller equipment to which they are attached, their use has diminished. Telescopic whip antennas have been used, whereby the antenna can be withdrawn into the body of the telephone when not in use, but again these are sizeable in use, and like all moving parts, are prone to damage. Coil or helical antennas offer relatively good performance in return for a small size. However, as the antenna is still external to the main body of the telephone, and usually projects from a top surface, it is prone to damage, and can reduce the aesthetic appeal of the telephone to which it is attached.

Consequently, there is an increasing desire to position the antenna internal to the main body of the telephone. Thus far, internal antennas tend to have taken the form of plate antennas positioned towards the top of the telephone, but they tend to be relatively bulky, and require extra steps in the assembly process which ultimately increases the cost of the telephone, and offer more opportunity for errors to occur.

At the same time as the desire to provide internal antennas has increased, advances in manufacturing processes have enabled more complex housings to be manufactured. A particular process known as in-mould decoration (IMD) or in-mould labelling (IML) has become more widely used as an alternative to etching, printing, painting or metallisation of external surfaces. The terms IMD and IML are sometimes used to define slightly different processes but, essentially, both involve applying a decorative feature or label into a mould before the moulding material is injected. IMD will be used throughout this specification to refer to all variants of the process.

IMD has gained favour as it is capable of producing results more cheaply than alternative techniques involving separate moulding and printing processes.

There now follows a brief description of the IMD process.

The first stage in the IMD process is the production of the carrier film which will carry the decoration which will eventually be visible on the external surface of the final product. This carrier film is normally a thin plastics material decorated with the text or drawings which will be seen on the exterior of the moulding once the process is complete. The decoration process may be performed using any suitable printing process, such as screen printing or lithography.

The carrier film is next selectively heat or vacuum formed to take on the profile of the desired finished article. The result of this process is a 'shell'. It bears the external appearance of the finished article. i.e. all text or graphics is visible, but as the carrier film may only be of the order of a few hundred $\mu$m thick, it is very flimsy and unsuitable for use as a mechanical housing.

The next stage takes the shells, places them in a mould where they are back-injected with a suitable moulding material. This injection moulding stage may use a moulding material which is identical with the carrier film material, or other materials having different properties may be used. Example materials used in the injection moulding process may be rubbers or plastics having a variety of different characteristics.

The completed part is now more mechanically robust, and bears the desired external decoration which is visible beneath the carrier film. Importantly, the carrier film and moulding material are now effectively fused together, ensuring that the decoration is protected, since the protective carrier film can not be peeled away.

An alternative to pre-forming the carrier film is to insert the film into the mould in its un-formed, flat, state. The pressure of the injection moulding process then forces the film into the mould, and achieves the same end result. A benefit of this process is that the carrier film may be loaded into the mould via continuous roll feed, leading to improved automation of the process.

A further alternative in both cases described above is that the carrier film may be of a type which is discarded after the moulding is completed, i.e. it does not form part of the finished moulded part. In this case, the carrier film simply provides a means of applying the decoration or label to the moulding. The decoration is transferred to the moulded part during the injection moulding process. The finished moulded part then bears the decoration exposed on its surface.

SUMMARY OF THE INVENTION

According to a first aspect of the present invention, there is provided a method of producing an antenna, wherein said antenna is incorporated into a unitary housing element of an apparatus, comprising the steps of: printing onto a first surface of a carrier film, using conductive ink, the antenna; inserting said carrier film into a mould; and injecting moulding material into the mould.

According to a second aspect of the present invention, there is provided a method of producing an antenna, comprising the steps of: printing onto a first surface of a carrier film, using conductive ink, the antenna; inserting said carrier film into a mould; and injecting moulding material into the mould.

The housing element may be a rear cover for a mobile telephone.

Alternatively, the housing element may form an enclosure or any constituent part, either internal or external, for use in any part of any portable telecommunications equipment.

The method may be used to produce a discrete antenna part which is then fitted into a housing for an apparatus.

An advantage of the method is that it may be configured to produce a housing with a printed antenna disposed on an interior or an exterior surface. The surface may or may not be protected by the retention of the carrier film.

Advantageously, if the carrier film is retained to form an integral part of the housing element, this offers protection to the printed antenna from the wear and tear normally encountered during everyday use.

The characteristics of the antenna can be advantageously altered through use of a moulding material which has a relatively high dielectric constant ($\in$). Use of such a substrate allows smaller physical antennas to be used.

The carrier film may be printed on both surfaces. This allows graphic and/or text designs to be printed onto the side of the film opposite the antenna. The graphic or text design may then be visible from the exterior of the telephone.

In an advantageous development, the pressure and temperature experienced during the IMD process acts to increase the conductivity of the printed antenna above that which would otherwise be possible if the conductive ink were cured in the usual way.

An advantage of using the IMD process to produce housings incorporating printed antennas is that the antenna design may be easily and inexpensively varied without incurring major costs in changing production tooling. The mould design can remain unaltered: the only change needed is to the screen printing of the antenna on the carrier film.

According to a third aspect of the present invention, there is provided a unitary housing element for a portable telecommunications apparatus, said housing element comprising an antenna, wherein said antenna comprises an element composed of conductive ink, and said antenna is disposed between an outer surface of said housing element and an inner surface of said housing element.

According to a fourth aspect of the present invention, there is provided a unitary housing element for a portable telecommunications apparatus, said housing element comprising a first surface, a second surface and an antenna, wherein said first surface is defined by a film, said second surface is defined by a moulding material, and said antenna is printed onto a first surface of said film using conductive ink.

BRIEF DESCRIPTION OF THE DRAWINGS

For a better understanding of the present invention, and to understand how the same may be brought into effect, reference will now be made, by way of example only, to the appended drawings in which.

DETAILED DESCRIPTION

Figure 1:
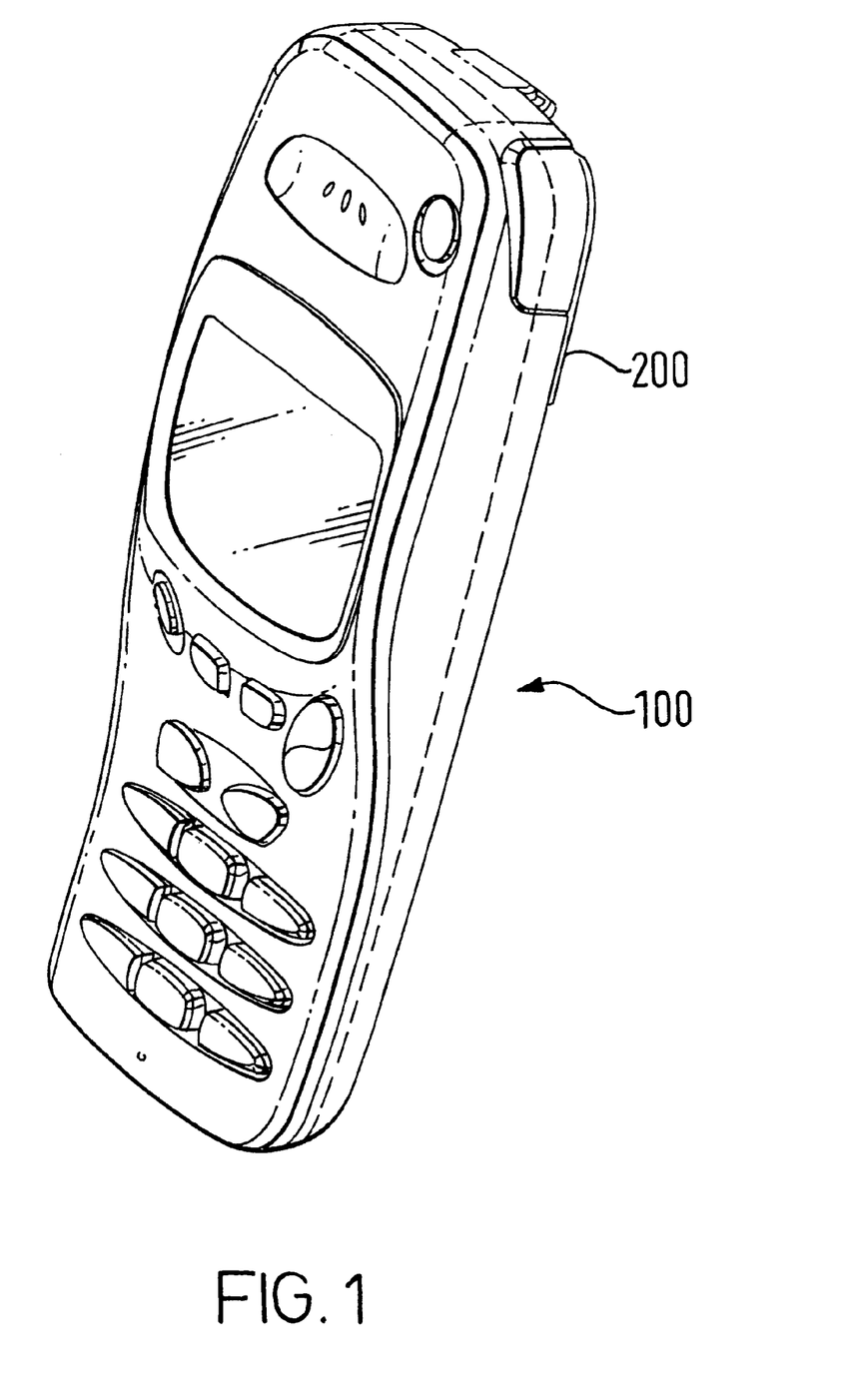
FIG. 1 shows a portable radiotelephone incorporating an internal antenna.

The portable radiotelephone 100 shown in FIG. 1 has no external antenna. It incorporates an antenna which is fabricated as an integral part of the mechanical housing according to an embodiment of the invention. In all other respects, the telephone is substantially the same as prior art telephones.

Figure 2:
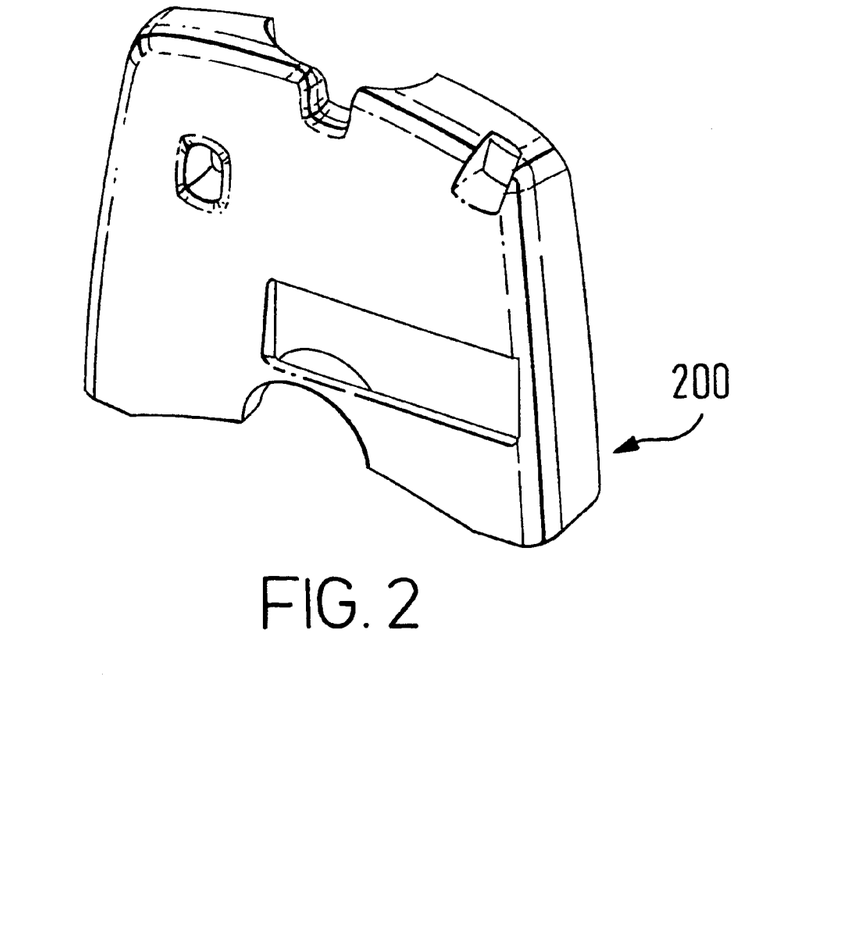
FIG. 2 shows a housing element of the portable radiotelephone of FIG. 1 which incorporates an antenna according to an embodiment of the invention.

FIG. 2 shows a close up view of the rear cover 200, or B-cover, of the telephone of FIG. 1. The B-cover is positioned at the upper rear of the telephone. This cover is constructed using the IMD process, and in this particular case, the antenna is entirely concealed within, and integral to, the body of the housing.

Figure 3:
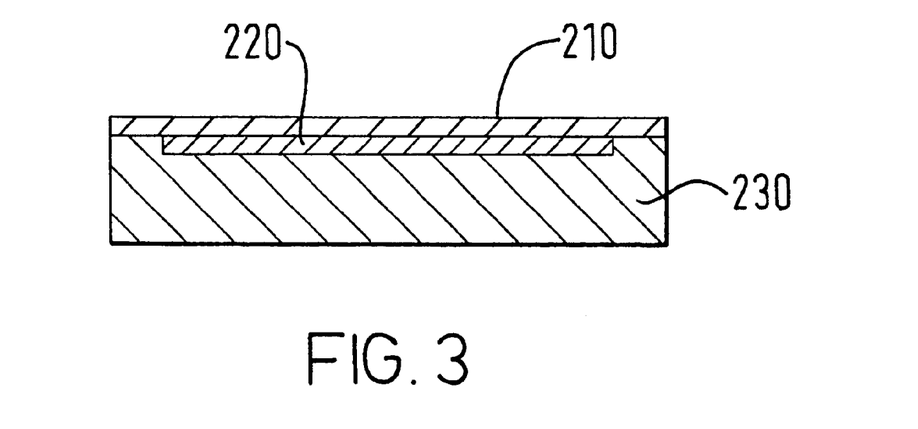
FIG. 3 shows a cross-section through the housing element of FIG. 2.

A cross-section through the body of the housing element of FIG. 2 is shown in FIG. 3. This shows the constituent parts of the completed moulded part, but it is important to note that once the moulding process is complete, the finished part can not be disassembled. i.e. it is a single unitary part.

The carrier film 210 forms the exterior surface of the housing, and forms a protective layer over the conductive ink antenna element 220. The moulding material 230 forms the interior surface of the housing. The antenna element 220 is thus sandwiched between the carrier film 210 on one side, and the moulding material 230 on the other.

Figure 4:
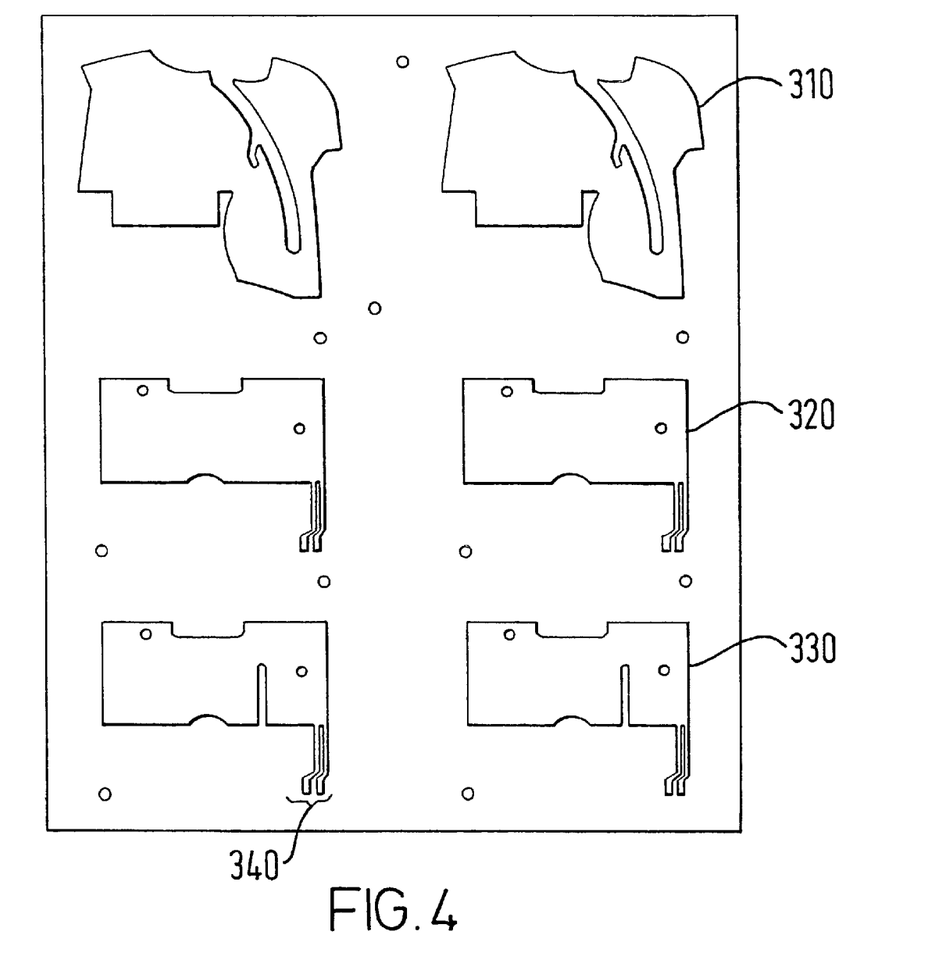
FIG. 4 shows a carrier film bearing 3 different printed antenna elements.

The design of the antenna 220 will vary markedly depending on the frequency and operating characteristics of the telephone. FIG. 4 shows a sample carrier film which has been printed with 2 each of 3 different antenna designs. The upper antenna 310 is a complex dual band antenna designed to operate on two different frequency bands. The lower antennas 320, 330 are simpler single band antennas.

Antennas 320 and 330 show the connecting pads 340 via which the antenna connects with the RF circuitry of the transceiver of the telephone. These may be configured such that they are not covered with the moulding material, and are therefore exposed for connection. Connection may be arranged to occur automatically when the B-cover is fitted to the telephone body. This may be achieved through use of a pair of flexible, conductive elements which are connected to the transceiver at one end, with the free ends being positioned to contact the respective pads 340 of the antenna. When the B-cover 200 is attached to the body of the telephone 100, the flexible elements will be brought into contact with the connecting pads of the antenna incorporated into the B-cover 200, thus completing the antenna circuit.

Screen printing is the preferred technique for printing the antenna using conductive ink, but any other suitable process may be employed. There are a number of such conductive inks widely available from manufacturers such as DuPont, Coates Electrographics, Acheson and Bayer. In general, the conductive inks comprise extremely fine silver particles in suspension in a solvent and carrier base mixture. The conductivity of these inks is usually too low to allow them to be used effectively for printed antennas. However, it has been found that the application of higher temperatures and higher pressures to the pre-cured ink can increase the conductivity to a point where use in antenna structures becomes practicable. The higher temperature and pressure act to force the silver particles into closer contact with each other, thus increasing the conductivity of the dried and cured printed antenna. It has been found that the temperature and pressure profile which occurs in the injection moulding process is suitable to sufficiently increase the conductivity of an antenna element formed from conductive ink.

Figure 5A:
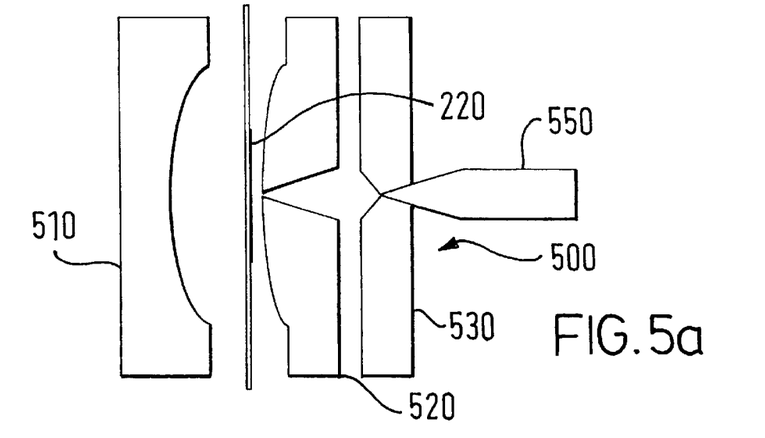
FIGS. 5a, 5b & 5c show 3 stages in the IMD process used to manufacture the housing of FIG. 2.
Figure 5B:
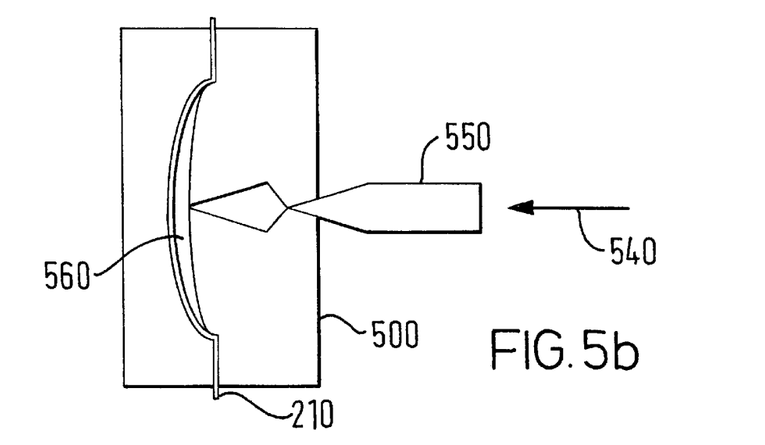
Figure 5C:
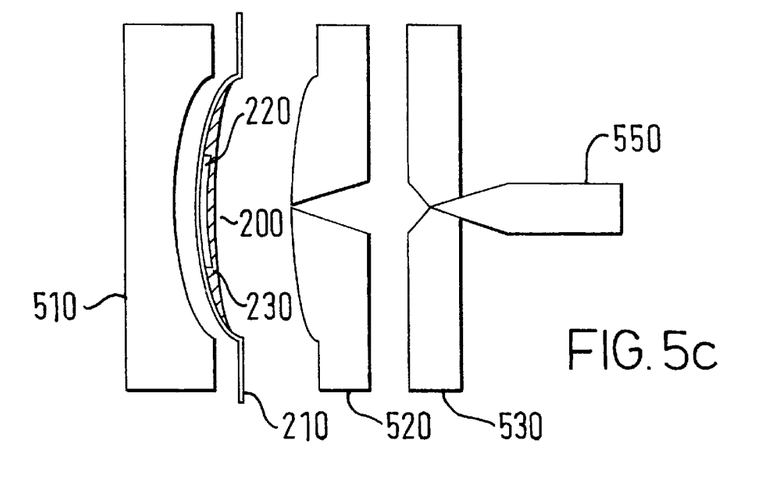

FIGS. 5a to 5c show the key steps in the injection moulding process via which the B-cover housing is produced.

FIG. 5a shows how the pre-printed antenna 220 on the carrier film 210 is placed into the mould 500. The conductive ink is dried but not completely cured at this point. The mould 500 is made up of three main parts: a first part 510 which forms the rear of the mould, and against which the carrier film 210 is formed; a second part 520 which forms the front of the mould, and through which the moulding material 230 is injected; and a final injection part 530 which connects to a reservoir of moulding material via a nozzle 550. The film 210 is inserted into the mould 500 such that the side of the film opposite the side bearing the printed antenna element is facing the interior surface of the mould. i.e. the antenna element 220 will come into direct contact with the moulding material 230.

FIG. 5b shows the mould 500 and carrier film 210 when all components of the mould 500 are securely fastened together. The molten moulding material is injected 540 under pressure from a reservoir through the nozzle 550 into the mould cavity 560. The pressure is sufficient to deform the carrier film 220 such that it adopts the shape of the rear of the mould 510. The pressure forces moulding material 230 into all areas inside the mould cavity 560.

When cooled, the mould is opened, as shown in FIG. 5c, to reveal the B-cover 200. Excess carrier film 210 is present around the edges of the B-cover 200, and must be removed before the B-cover 200 can be fitted. It can be seen how the shape of the B-cover 200 is dictated by the shape of the mould cavity 560.

In an alternative embodiment, the carrier film 210 does not form part of the finished housing. It is printed with the antenna design in exactly the same way as the previously described embodiment, but the materials and process are selected so that the carrier film 210 does not bond with the moulding material 230. In this case, the printed antenna pattern 220 is transferred to the moulding 230, and the carrier film 210 is discarded when the mould 500 is opened.

This is not at present thought to be such a practicable alternative, as the printed antenna will be left exposed on the surface of the housing 200, and even though the conductive inks are relatively tough and scratch resistant, it is preferable to position them behind a protective layer, such as is provided by the carrier film 210 in the previously described embodiment.

Any moulding material 230 which offers suitable mechanical properties may be chosen. For instance, the weight, hardness or rigidity may all be factors which are taken into account.

A particularly suitable moulding material is a ceramic loaded polymer. This is preferred because a material with a relatively higher dielectric constant, when used as a substrate for the printed antenna, can allow the physical size of the antenna to be reduced. This is important as the overall size of portable radiotelephones decreases.

A wide variety of suitable materials are available. A particularly suitable material, however, is disclosed in our co-pending GB patent application 9811664.3.

Figure 6A:
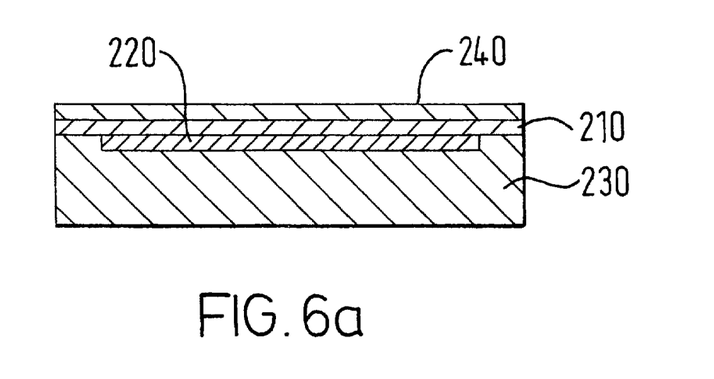
FIG. 6a shows a cross-section through a housing according to an alternative implementation of the invention.

It will be apparent to the skilled man that there are numerous alternative implementations which fall within the scope of the invention. For instance, with the antenna printed on one side of the carrier film, a graphic design or logo may be printed on the opposite side of the film. This allows the antenna, which is not particularly aesthetically pleasing, to be hidden behind a more pleasing surface. An example of a B-cover employing such an arrangement is shown in cross section in FIG. 6a. Here, the carrier film 210 is pre-printed using regular coloured inks on what will become the exterior surface 240 with the desired image or text. This print is dried and cured in the normal manner. The antenna design 220 is then printed onto the opposite side as previously described. The injection moulding process can now be used as before to produce a B-cover which now has a more pleasing external appearance.

Figure 6B:
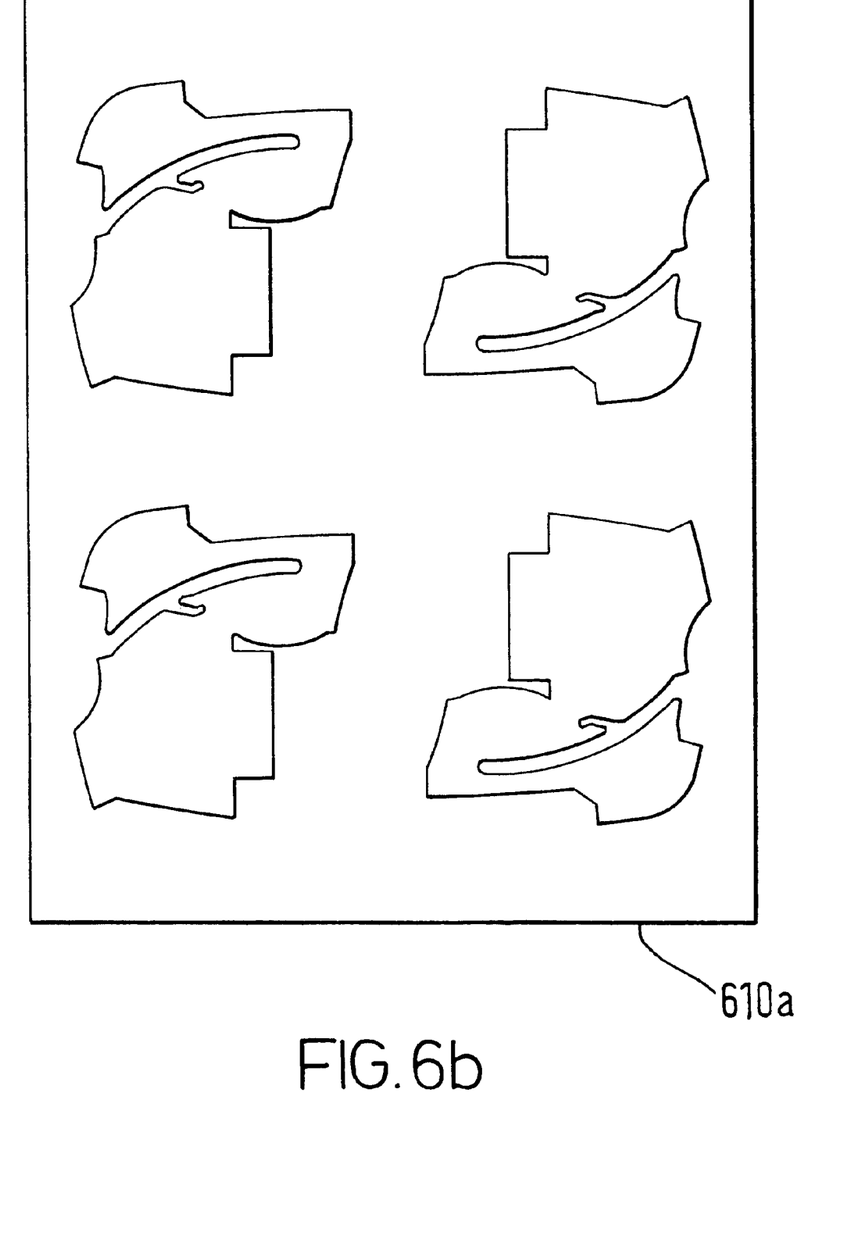
FIGS. 6b & 6c show alternative carrier films which form alternative implementations of the antenna.
Figure 6C:
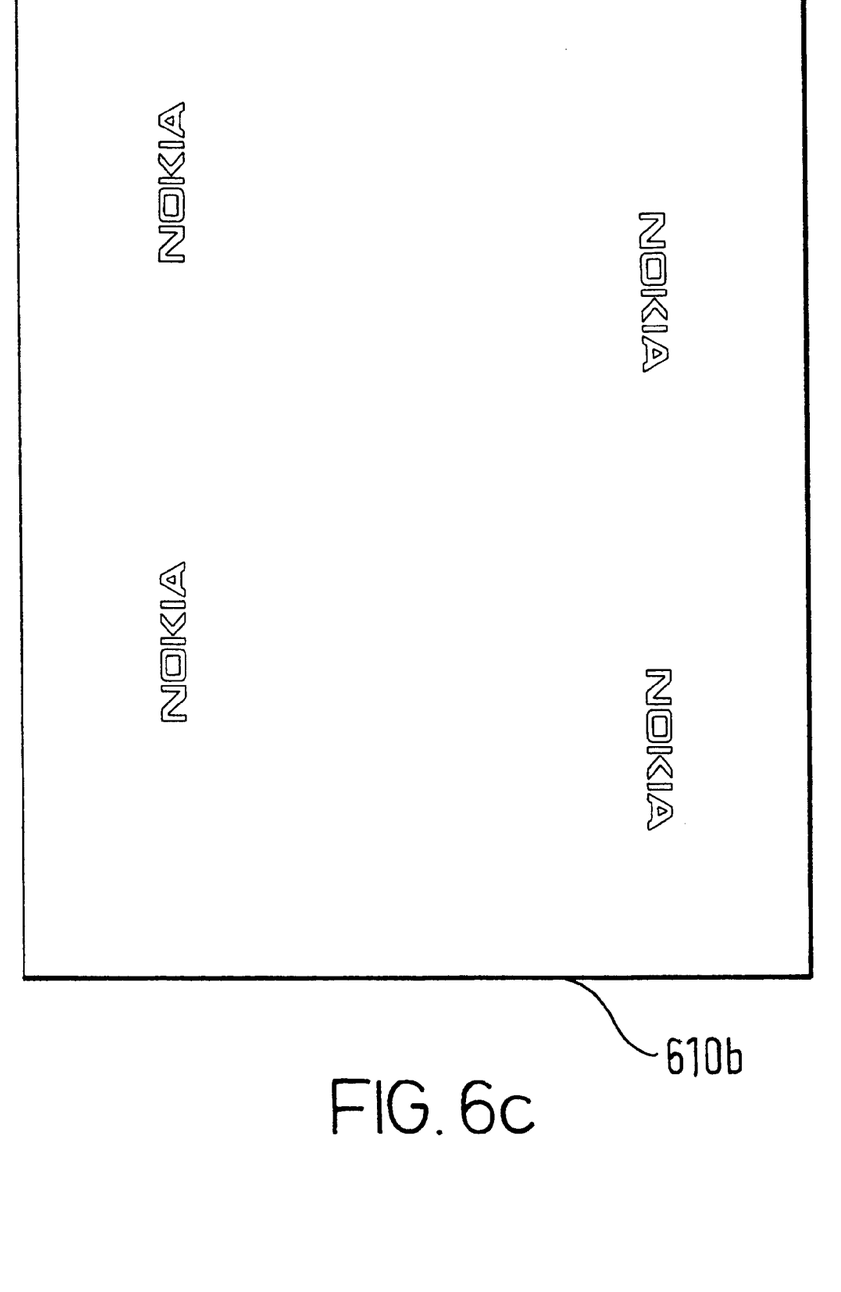

FIGS. 6b and 6c show the two sides of a sample carrier film. First surface 610a shows four individual antenna designs which will be in direct contact with the moulding material when moulding commences. Second surface 610b shows a logo which will be visible from the exterior of the housing when removed from the mould. In this instance, the manufacturer's logo is shown, but any design which can be printed onto the carrier film may be used.

If necessary, a protective film may be applied to the exterior surface prior to the moulding process, or subsequently. This will depend on the properties of the ink used for printing onto the external surface.

Another alternative embodiment which allows graphic and/or textual printing to be visible from the exterior of the housing may be achieved by printing a first surface of the carrier film with the required graphic design using regular coloured inks, and then over printing the same surface using conductive ink to form the antenna. This ensures that the antenna is obscured from view, and that the graphic layer and the antenna are protected by the carrier film.

Further alternatives are envisaged where the carrier film forms the interior surface of the housing. This configuration requires a different mould configuration to that shown in FIG. 5, but the result is still an antenna sandwiched between the carrier film and the moulding material. In this embodiment, there is no disadvantage to configuring the process such that the carrier film is discarded i.e. it does not form an integral part of the housing. This is because the antenna is safely printed onto the interior surface of the moulded housing, where it is not subject to the wear and tear which may affect a similar antenna on the exterior of the housing.

The present invention includes any novel feature or combination of features disclosed herein either explicitly or any generalization thereof irrespective of whether or not it relates to the claimed invention or mitigates any or all of the problems addressed.

What is claimed is:

1. A method of forming an unitary housing element of an apparatus and incorporating an antenna into the unitary housing element, said method comprising the steps of:
    printing onto a first surface of a carrier film, using conductive ink, the antenna;
    inserting said carrier film into a mould; and
    forming the unitary housing element by injecting moulding material into the mould,
    wherein the carrier film including the antenna is incorporated into the unitary housing element.

2. The method as claimed in claim 1, wherein said carrier film forms an integral part of the said unitary housing element.

3. The method as claimed in claim 1, wherein said carrier film is inserted into the mould such that said first surface of said carrier film is positioned to be in direct contact with said moulding material.

4. The method as claimed in claim 1, wherein said carrier film is pre-shaped before being inserted into said mould.

5. The method as claimed in claim 1, wherein said moulding material comprises a relatively high dielectric material.

6. The method as claimed in claim 1, wherein a surface of said carrier film is printed with a text or graphic design, prior to printing the antenna.

7. The method as claimed in claim 1, wherein temperature and pressure conditions associated with the moulding process act to increase the conductivity of said printed antenna.

8. An unitary housing element for a portable telecommunications apparatus, said unitary housing element comprising:
    an antenna,
    wherein said antenna comprises an element composed of conductive ink printed into a carrier,
    wherein said antenna including said carrier is disposed between an outer surface of said unitary housing element and an inner surface of said unitary housing element, and
    wherein said antenna including said carrier is incorporated into said unitary housing element when said unitary housing element is moulded.

9. The unitary housing element as claimed in claim 8, wherein said antenna including said carrier is disposed proximal to an exterior surface of said unitary housing element.

10. An unitary housing element for a portable telecommunications apparatus, said unitary housing element comprising:

a first surface;

a second surface; and an antenna, wherein said first surface is defined by a film, wherein said second surface is defined by a moulding material, and said antenna is printed onto a surface of said film using conductive ink, and wherein said film having said antenna printed onto said surface thereof is incorporated into said unitary housing element when said unitary housing element is moulded.

11. The unitary housing element as claimed in claim 10, wherein said surface of said film having said antenna printed thereon is disposed between said first surface and said second surface of said unitary housing element.

12. A method of forming an unitary housing element of an apparatus and incorporating at least one of graphics and color and an antenna into the unitary housing element, said method comprising the steps of:

printing onto a first surface of a carrier film the at least one of graphics and color;

printing on a second surface of said carrier film, using conductive ink, the antenna;

inserting the carrier film into a mould; and forming the unitary housing element by injecting moulding material into the mould, wherein the carrier film including the antenna is incorporated in the unitary housing element.

13. An unitary housing element for an apparatus, comprising:

an antenna, wherein said antenna comprises an element composed of conductive ink, wherein said antenna is disposed between an outer surface of said unitary housing element and an inner surface of said unitary housing element printed onto a carrier, wherein said antenna including said carrier is incorporated into said unitary housing element when said unitary housing element is formed by moulding material, and wherein said moulding material of said unitary housing element is a moulding material having a high dielectric constant so as to improve the performance of the antenna.

14. An unitary housing element as claimed in claim 13, wherein said moulding material is a ceramic loaded polymer.

* * * * *